March 5, 1963  J. G. BRADBURY  3,079,675
INVERTED PLUG TYPE VALVE
Filed April 28, 1959  2 Sheets-Sheet 1
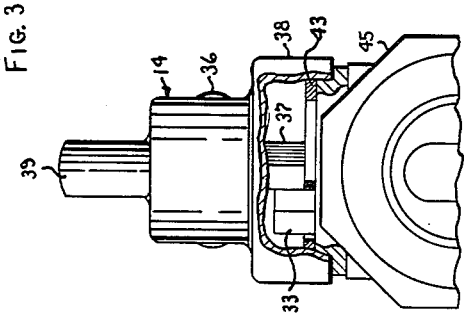
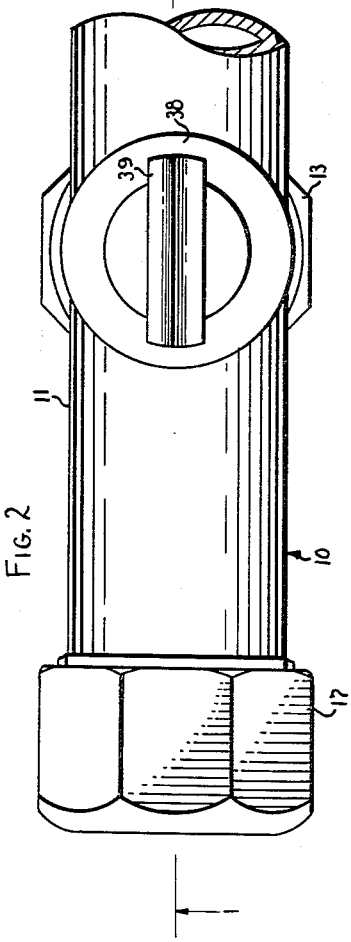
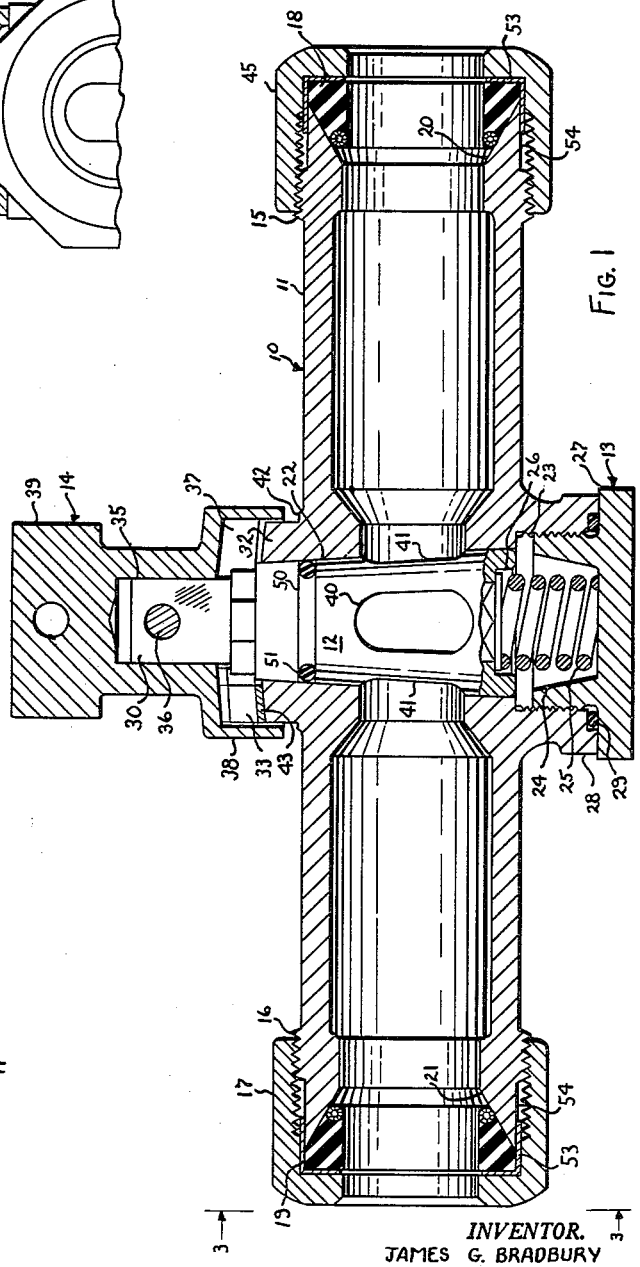
INVENTOR.
JAMES G. BRADBURY
BY
Charles L. Lovercheck
ATTORNEY March 5, 1963  J. G. BRADBURY  3,079,675
INVERTED PLUG TYPE VALVE
Filed April 28, 1959  2 Sheets-Sheet 2

INVENTOR.
JAMES G. BRADBURY
BY
Charles L. Lovercheck
ATTORNEY

United States Patent Office 3,079,675
Patented Mar. 5, 1963

3,079,675
INVERTED PLUG TYPE VALVE
James G. Bradbury, Erie, Pa., assignor to Hays Manufacturing Company, Erie, Pa., a corporation of Pennsylvania
Filed Apr. 28, 1959, Ser. No. 809,410
1 Claim. (Cl. 29—157.1)

This invention relates to valves and, more particularly, to the type of valves known as inverted plug type valves.

Some of the important features of the present valve are that the plug is spring loaded at the bottom and the plug can be unseated by applying pressure at the top of the cap. The amount the plug can be unseated is limited by the bottom of the inside lugs of the T head cap hitting the top of the body. The amount the plug can be moved off of the seat is fixed and uniform on all stops and is obtained by the use of a spacer gauge between the bottom of the lug in the T head cap and the top of the body at the time of assembling and drilling the pin hole through the head of the plug and cap. After the pin hole is drilled, the cap and spacer are removed from the head of the plug and the cap replaced and the pin inserted. The space left by removing the spacer gauge is the amount the plug can then travel from its seat.

Since the travel is limited inside of the cap, travel space is protected from dirt, sand, and small pebbles becoming lodged in this space, thereby preventing the plug from being removed from the seat when the valve is used underground.

The skirt on the cap does not limit the travel in the present design but does prevent foreign material from easily entering inside of the cap and lodging in the space allotted for travel. Since the inside of the skirt on the T head cap is machined and the outside diameter of the body is machined, the clearance between the two members can be held closer than if one or both members are left rough as cast. This is a further advantage in preventing dirt from entering inside of the cap. The plug is driven by the T head cap which is pinned to the head of the plug.

It is, accordingly, an object of this invention to overcome the disadvantages of valves made according to prior designs and, more particularly, it is an object to provide a valve which is simple in construction, economical to manufacture, and simple and efficient to use.

Another object of the invention is to provide an improved plug valve wherein the plug can be unseated a predetermined limited amount.

A further object of the invention is to provide an improved method of assembling a plug in a plug valve.

A still further object of the invention is to provide an improved plug in combination with a plug valve.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a longitudinal cross sectional view taken on line 1—1 of FIG. 2;

FIG. 2 is a broken away top view of a valve according to the invention;

FIG. 3 is a partial sectional view of the valve taken on line 3—3 of FIG. 1;

Figure 4:
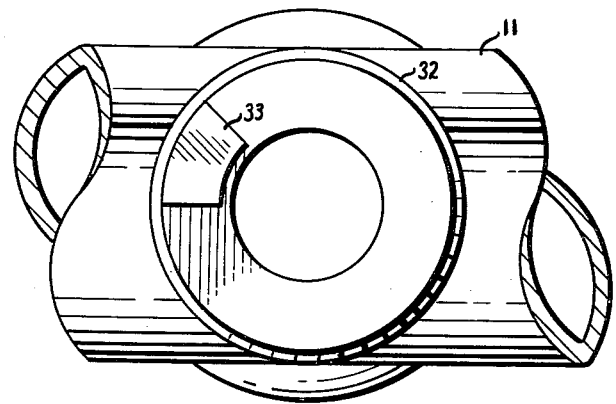
FIG. 4 is a top view of the valve with the head cap removed showing the stop lug.
Figure 5:
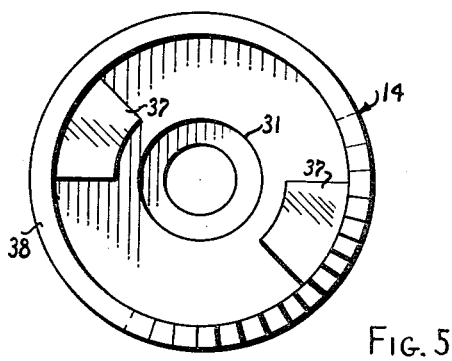
FIG. 5 is a bottom view of the T head cap.

Now with more specific reference to the drawings, a valve 10 is shown having a body 11, a plug 12, a bottom cap 13, and a T head cap 14.

The body 11 is hollow and has externally threaded portions 15 and 16 on the ends thereof which receive nuts 45 and 17. The nuts 45 and 17 have flanges overlying resilient washers 18 and 19 for compressing them into the inner peripheries of inwardly tapering bores 20 and 21 and to compress them against a tube inserted therein to connect the valve 10 in a fluid line. Cup like washer inserts 53 overlie the washers 18 and 19 and slide on a cylindrical surface 54 on the end of the body 11 to retain the washers 18 and 19 in the tapered bores 20 and 21.

The body 11 has a central bore 22 which intersects the hollow through the body 11. The central bore 22 is tapered and ground to complementary shape with the outer periphery of the plug 12. The lower end of the central bore 22 is counterbored and threaded at 23 to receive the bottom cap 13. The bottom cap 13 has a recess 24 which extends into an internally threaded boss 28 at the center thereof. The recess 24 receives one end of a spring 25. The other end of the spring 24 engages a bore 26 in the bottom of the plug 12. The outer end of the threaded boss 28 which is part of the body 11 has a flange 27 which overlies the lower end of the bored boss 28 and an O-shaped sealing member 29 is compressed between the flange 27 and the end of the boss 28.

The plug 12 has an outer peripheral surface which is tapered to sealingly engage the tapered bore 22. In assembled position in the body 11, the plug 12 terminates at its lower end in spaced relation to the lower cap 13 so that the plug 12 can be forced down against the force of the spring 25 to unseat it. The plug 12 has a peripheral groove 50 adjacent the upper end thereof which receives an O-ring 51 which forms a seal between the plug 12 and the tapered bore 22.

The top of the body 11 has a boss 32 thereon. The boss 32 is bored and the bore therein forms a continuation of the tapered bore 22 which receives the plug 12. The upper end of the plug 12 has a reduced size portion 30 which is received in a bore 35 in the cap 14. The boss 32 has a stop lug 33 thereon which extends up from the boss 32 at one side of the outer periphery of the bore 22.

The T head cap 14 has a flattened wrench receiving key portion 39 on the upper end thereof and has an outwardly and downwardly extending skirt 38 which defines a counterbore in the cap 14 with spaced lugs 37 therein. The lugs 37 move from one side to the other of the lug 33 when the plug 12 and cap 14 are rotated, thereby forming a limit stop for the cap 14.

The lower end of the skirt 38 is supported a spaced distance above a machine surface 42 and held in this position by means of a spacer gauge 43 inserted between the lower edge of the lug 37 and the upper edge of the boss 32 while the hole for a pin 36 is being bored through the head cap 14 and the reduced size portion 30 to receive the pin 36. After the hole for the pin 36 is bored, the cap 14 and the spacer gauge 43 can be removed and the cap 14 replaced. Therefore, when the pin 36 is in position, the operator can strike the top of the T head cap 14 a blow and urge the cap 14 down a distance equal to that of the space between the lower edge of the lug 37 and the upper surface of the boss 32. Therefore, the plug 12 will be unseated against the force of the spring 25. The spring 25 will immediately push the plug 12 upward into sealing engagement with the inside of its bore but the plug 12 will have broken loose so that it can be rotated.

The plug 12 has a port 40 therein which may be rotated to align with the flow passage through the valve 10 when the plug 12 is rotated to bring one lug 37 into engagement with the lug 33. The plug 12 may be rotated to bring the other lug 37 into engagement with the lug 33 and to bring the port 40 out of the flow passage. The plug 12 has false ports 41 which form indentations on each side thereof.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A method of assembling a valve having a hollow body with a tapered plug disposed in a central bore in said hollow body, a T head cap to be attached to said plug, said cap having a skirt, and a surface on said T head cap to be disposed a predetermined distance from said body comprising inserting said plug in said central bore, arranging said T head cap on said plug with a spacer gauge completely enclosed by said skirt and between said T head cap and said body, cutting a continuous cut through said cap and said plug, and removing said cap with said skirt, removing said spacer gauge, replacing said cap, and attaching said T head cap to said plug by means of a member in said cut whereby said plug may be moved through the distance equal to the dimension of said gauge to break said plug loose from said body.

References Cited in the file of this patent

UNITED STATES PATENTS

| | | |
|---|---|---|
| 1,784,238 | Kennedy | Dec. 9, 1930 |
| 1,898,577 | Ford | Feb. 21, 1933 |
| 2,481,862 | Muller et al. | Sept. 13, 1949 |
| 2,642,257 | Mueller | June 16, 1953 |
| 2,738,799 | Mueller | Mar. 20, 1956 |
| 2,787,824 | Kaczor | Apr. 9, 1957 |

FOREIGN PATENTS

| | | |
|---|---|---|
| 166,912 | Germany | Apr. 12, 1905 |